United States Patent

Kramer et al.

[11] Patent Number: 5,223,956
[45] Date of Patent: Jun. 29, 1993

[54] OPTICAL BEAM SCANNERS FOR IMAGING APPLICATIONS

[75] Inventors: Charles J. Kramer, Rochester; Mehdi N. Araghi, Webster, both of N.Y.

[73] Assignee: Holotek Ltd., Rochester, N.Y.

[21] Appl. No.: 860,532

[22] Filed: Mar. 30, 1992

[51] Int. Cl.$^5$ .......................... G02B 5/18; G02B 5/30; G02B 26/10; G02B 27/28
[52] U.S. Cl. ...................................... 359/17; 359/220; 359/495; 359/499; 359/569
[58] Field of Search .................... 359/17, 18, 220, 221, 359/225, 226, 495, 500, 499, 566, 569

[56] References Cited

U.S. PATENT DOCUMENTS

| | | |
|---|---|---|
| 4,779,944 | 10/1988 | Ritter et al. |
| 4,852,956 | 1/1989 | Kramer |
| 5,009,472 | 4/1991 | Morimoto ........................ 359/495 |
| 5,097,351 | 3/1992 | Kramer ................................ 359/17 |

FOREIGN PATENT DOCUMENTS

| | | | |
|---|---|---|---|
| 60-172017 | 9/1985 | Japan | 359/17 |
| 61-122626 | 6/1986 | Japan | 359/495 |
| 63-306415 | 12/1988 | Japan | 359/17 |
| 2-226111 | 9/1990 | Japan | |

OTHER PUBLICATIONS

Kramer, "Holographic Deflector for Graphic Arts Systems," Chapter 5, *Optical Scanning*, G. F. Marshall, Ed., New York, Marcel Dekker Inc., 1991, pp. 213 and 268 to 273, 306 to 319.

*Primary Examiner*—Martin Lerner
*Attorney, Agent, or Firm*—M. LuKacher

[57] ABSTRACT

Laser beam scanners having a polarization sensitive beam deflecting surface (specifically a monofacet nondisc plane diffraction grating (NPDG) monofacet deflector and a dual reflection monofacet polarization sensitive deflector that incorporates a polarizing beam splitter cube) achieve essentially 100% radiometric throughput efficiency while also achieving a scan beam intensity that stays constant over the total range of scan angles by using a circularly polarized incident beam and a quarter-wave retardation plate at the entrance aperture of the scanner assembly so that the quarter-wave plate rotates with the assembly. The quarter-wave plate has its optical axis oriented with respect to the incident beam so that it converts the incident circularly polarized beam into a linearly polarized beam having a polarization direction that maximizes the radiometric throughput efficiency of the scanner assembly. The polarization direction of the converted linearly polarized beam stays constant relative to the deflecting surface, as a result of using the circularly polarized incident beam and the quarter-wave plate which rotates with the deflecting surface.

17 Claims, 3 Drawing Sheets

OPTICAL BEAM SCANNERS FOR IMAGING APPLICATIONS

FIELD OF THE INVENTION

The present invention relates to optical beam scanners which deflect a laser beam (also called deflectors) for imaging applications, and particularly to rotatable scanner units which scan a laser beam about a rotation angle up to 360° for internal drum applications and with high accuracy and radiometric efficiency.

The application is related to the U.S. patent application Ser. No. 07/835,160, of C. J. Kramer, filed Feb. 13, 1992.

Kramer, U.S. Pat. No. 4,852,956 issued Aug. 1, 1989 and C. J. Kramer "Holographic Deflector for Graphic Arts Systems", chapter 5 in the text "Optical Scanning", G. F. Marshall, Ed., Published by Marcel Dekker Inc., N.Y. (1991) describe monofacet nondisc plane diffraction gating (NPDG) deflectors for internal drum and flat field imaging applications. Tashiro, Japanese patent publication 2-226111, Sept. 1990 describes a two reflection monofacet polarization sensitive beam deflector that incorporates a polarizing beam splitter cube, a quarter-wave retardation plate and a high reflecting mirror surface. An incident P polarized beam enters the cube beam deflector element through its top surface and propagates to the polarization sensitive beam splitter reflector surface that is sandwiched between the two essentially identical 45 degree right angle prism elements comprising the cube deflector element. This polarization sensitive beam splitter reflecting surface has the property that at a specific wavelength it transmits virtually 100 percent of P polarized light while reflecting virtually 100 percent of S polarized light. The S polarized retroreflected beam propagates back to the polarization sensitive beam splitter reflecting surface where it is essentially totally reflected in a direction perpendicular to the deflector rotation axis and emerges from the deflector element as an S polarized scanning light beam.

One of the disadvantages of the NPDG deflector geometries and of the Tashiro cube deflector is that their scan beam intensity decreases as a function of scan beam angle when used with a linearly polarized incident laser beam. This scan beam intensity decrease with deflector scan angle is not a significant problem for flat-field imaging systems since F-Theta scan lens considerations usually limit deflector rotation angle to a maximum of ±27 degrees and, therefore, the intensity fall-off can be compensated for by electronically changing the modulation intensity of the scan beam as a function of scan angle. This scan beam intensity fall-off with scan angle is, however, a significant problem for internal drum imaging systems because the majority of these systems use deflector rotation angles of between ±85 and ±135 degrees and, therefore, the intensity fall-off cannot be electronically compensated for. The scan beam intensity dependence on scan angle can be eliminated in NPDG deflectors by using either a randomly or circularly polarized laser incident beam which, unfortunately, reduces the deflector radiometric throughput efficiency to less than 50 percent. See the above referenced Kramer patent and text chapter.

In the polarization sensitive beam splitter reflector surface of the Tashiro deflector, P polarized light is virtually 100 percent transmitted while S polarized light is virtually 100 percent reflected and, therefore, the scan beam intensity is very dependent on the initially incident beam polarization state. Also, this polarization sensitivity property of the deflector produces scan beam intensity variation as a function of the deflector rotation angle, $\theta_R$ when a linearly polarized light source is used with the deflector. The relationship between scan beam intensity, I, and deflector rotation angle is:

$$I = I_S \sin^2\theta_R + I_P \cos^2\theta_R \tag{1}$$

where $I_S$ and $I_P$ are, respectively, the intensities of the S and P polarized directions of the incident beam. Equation (1) shows that the scan beam intensity for the Tashiro deflector decreases as $\cos^2\theta_R$ for the linearly polarized incident beam condition.

For NPDG beam deflectors, one can achieve essentially 100% diffraction efficiency for S polarized light while achieving only about 5% diffraction efficiency for P polarized light. See the above referenced text chapter authored by C. J. Kramer, P. 269-272, and Kramer U.S. Pat. No 4,973,112, issued Nov. 27, 1990. This diffraction efficiency sensitivity to polarization state reduces deflector radiometric efficiency for randomly and circularly polarized light applications. This diffraction efficiency property also produces scan beam intensity variation as a function of scan angle when a linearly polarized light source is used with NPDG deflector. The relationship between diffracted beam intensity, I, and NPDG deflector rotation angle, $\theta_R$, is given by:

$$I = I_S(E_P\sin^2\theta_R + E_S\cos^2\theta_R) + I_P(E_P\cos_2\theta_R + E_S \sin^2\theta_R), \tag{2}$$

where $E_P$ and $E_S$ are, respectively, the diffraction efficiencies for P and S polarized light, and $I_P$ and $I_S$ are the intensities of the P and S polarized light components of the incident beam, respectively.

Equation (2) shows that the variation in scan beam intensity as a function of deflector rotation angle for the NPDG beam deflector assemblies is essentially equal to $\cos^2\theta_R$ when the incident laser beam is S polarized for $\theta_R = 0$. Uniform scan beam intensity may be achieved, but at the expense of approximately 50 percent of the incident beam power. High radiometric throughout efficiency may be achieved, but at the expense of a decrease in scan beam intensity as a function of a deflector rotation angle.

Tashiro proposes to rotate the laser light source with the deflector assembly as a way to solve the problem of the scan intensity decreasing as a function of deflector rotation angle. This solution is not practical in most imaging applications, particularly those requiring a high deflector rotation rate. In addition, rotation of the laser source with the deflector assembly makes the cross-scan beam error of the laser/deflector assembly sensitive to changes in assembly wobble angle and, thereby, effectively cancels the scan beam error performance achieved by having two reflections within the deflector element.

SUMMARY OF THE INVENTION

The present invention improves polarization sensitive deflectors, including both the NPDG deflectors and the polarization beam splitter cube deflectors to achieve essentially 100 percent radiometric throughput efficiency while also achieving a scan beam intensity that stays constant over the total range of scan angles. The invention therefore provides improved laser beam deflectors.

In accordance with the invention, these improved deflectors are achieved by using a circularly polarized incident beam and attaching a quarter-wave retardation plate to the entrance aperture of the deflector assembly, so that the quarter-wave plate rotates with the deflector assembly. The attached quarter-wave plate has the correct angular orientation to convert the incident circularly polarized beam into a linearly polarized beam having a polarizated direction that maximizes the radiometric throughput efficiency of the deflector assembly. The polarization direction of the converted linearly polarized beam stays constant relative to the deflector assembly, as a result of using a circularly polarized incident beam and having the quarter-wave plate rotate with the deflector assembly.

BRIEF DESCRIPTION OF THE DRAWINGS

The foregoing and other objects, features and advantages of the invention will become more apparent from the following description when taken with the below listed drawings.

DETAILED DESCRIPTION

Figure 1:
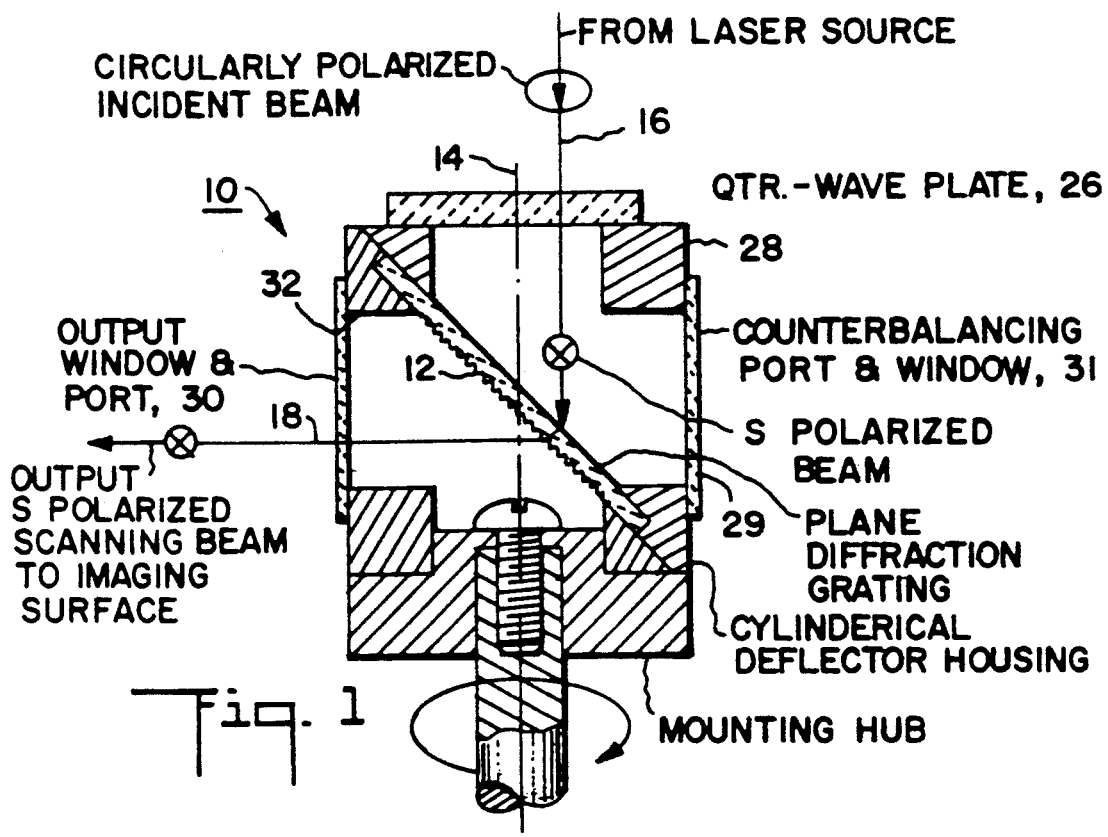
FIG. 1 is a sectional front view of an NPDG deflector unit in accordance with an embodiment of the invention.
Figure 2:
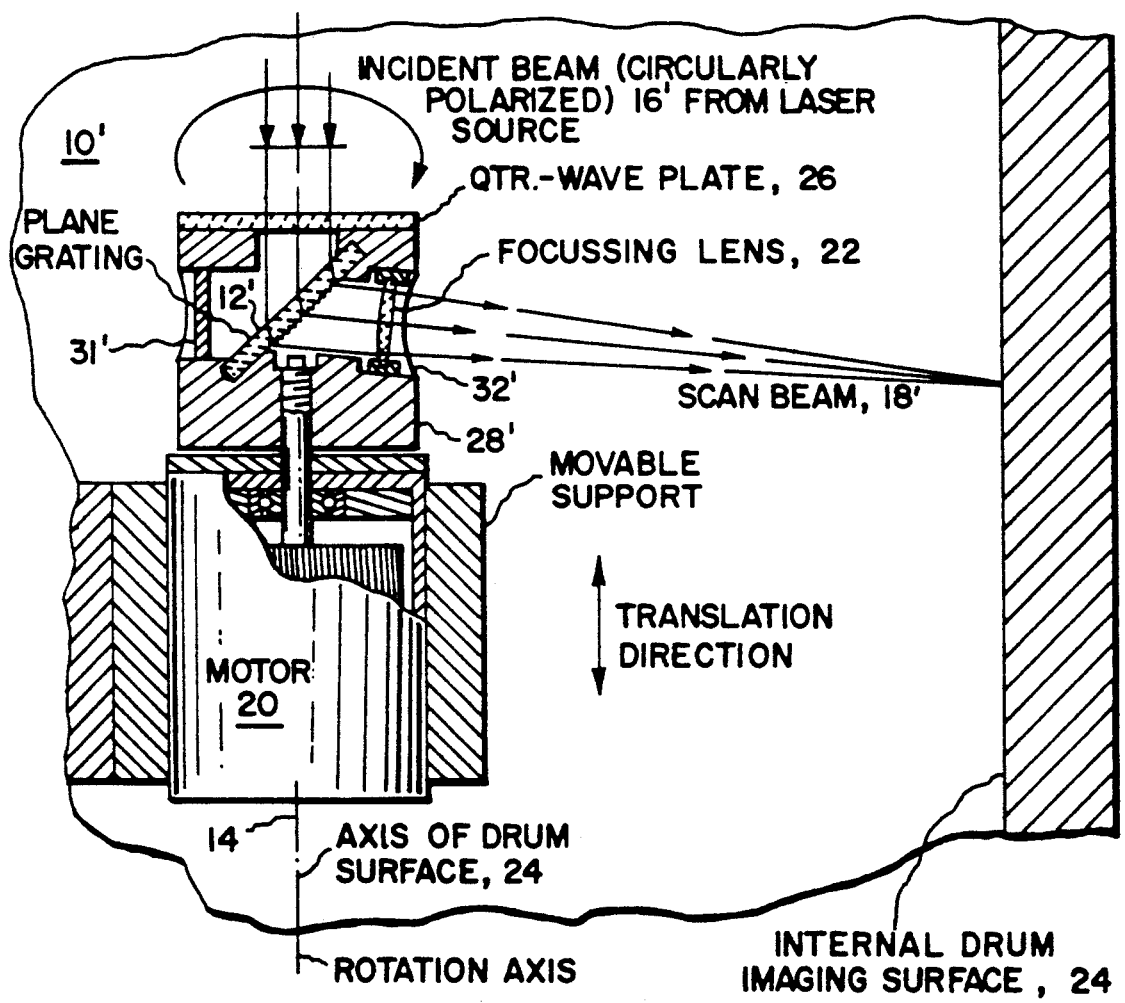
FIG. 2 is a diagrammatic view of an internal drum scanner system using a NPDG deflector unit similar to the unit shown in FIG. 1 which translates along the axis of an internal drum surface for internal drum imaging applications.

NPDG deflector units 10 and 10' as shown in FIGS. 1 and 2 are capable of achieving essentially 100 percent radiometric throughput efficiency while also achieving a constant scan beam intensity over the total range of scan angles. The unit 10 (FIG. 1) is a monofacet NPDG deflectors which utilize single transmission grating facets 12 and 12' orientated at approximately 45 degrees to the deflector rotation axis 14. This grating facet redirects an incident collimated laser beam 16 propagating along the deflector rotation axis 14 so that it exits the deflector unit, as the scanning beam 18 and 18', approximately Perpendicular to the rotation axis 14. Rotation of the deflector unit, or by a motor 20 (FIG. 2), causes the redirected beam from the deflector to scan through a scan angle that is equal to the deflector rotation angle.

As shown in FIG. 2, following the grating 12', there may be a single element lens 22 that rotates with the deflector unit 10', thereby enabling the deflector unit to generate high resolution images on the inside surface of a drum. A stationary F-Theta scan lens may follow the deflector unit 10' to image the scan beam from the unit to a scanning spot that generates a straight scan line on a flat imaging surface.

The deflected scanning beam in FIG. 2 is slightly offset from being perpendicular to the rotation axis so that the retroreflected, specular light from the internal drum image surface 24 does not propagate back along the incident beam and cause ghost beams and laser intensity instability. For the NPDG deflector system of FIG. 2 geometry, the scanning image spot size on the imaging surface has both constant size and constant scan velocity along the entire image surface, because the imaging surface is a cylinder having its axis collinear with the deflector rotation axis.

The deflector units in FIGS. 1 and 2 have a quarter-wave plate 26 and 26' which serves as the deflector entrance window. The incident beam 10 and 10' is circularly polarized by utilizing a laser which provides such a circularly polarized beam or with another quarter-wave plate, as is known in the art. See J. A. Ritter and C. J. Kramer, U.S. Pat. No. 4,779,944, issued Oct. 25, 1988. For illustrative purposes, only a single incident ray is shown in FIG. 1. Preferably the central incident beam ray for this deflector geometry is collinear with the deflector rotation axis as shown in FIG. 2.

Each quarter-wave plate 26 and 26' in FIGS. 1 and 2 has its optical axis angularly orientated so that it converts the incident circularly polarized beam into a S polarized beam with respect to the grating deflector element 12 and 12' surface. This S polarized beam is essentially 100 percent diffracted by the grating deflector element and emerges from the deflector as an S polarized scanning beam 18 and 18'. Scanning beam intensity is constant as a function of deflector rotation angle for the illustrated deflector configurations because the polarization state of the converted linearly polarized beam stays constant relative to the grating deflector element surface as a result of using a circularly polarized incident beam 16 and 16' and having the quarter-wave plate 26 and 26' rotate with the deflector assembly.

FIG. 2 illustrates that the proposed technique for improving scan radiometric efficiency and uniformity can be readily applied for internal drum imaging applications and, thereby effectively doubles the radiometric throughput efficiency of NPDG deflectors used for internal drum imaging applications. While the quarter-wave plates 26 and 26' in both FIGS. 1 and 2 are depicted as covering essentially the total top surface of the deflector housings 28 and 28', these quarter-wave plates need only be as large as the deflector entrance aperture and, therefore, could have the form of a circular window in an adapter that is screwed into the entrance port aperture, and may be similar in arrangement to the focusing lens 22 and flat output and ported window used in to the output apertures 32' of the housing 28' of the deflector 10' in FIG. 2. This type of screw arrangement also facilitates the angular orientation of the quarter-wave plate optical axis relative to the plane of incidence of the grating deflector element 12 and 12'.

Having the ability to alter the angular orientation of the quarter-wave plate not only allows one to maximize the radiometric throughput efficiency of the NPDG deflector, but also allows the throughput efficiency to be varied between approximately zero and 100 percent. Being able to vary the deflector throughput efficiency is useful in many imaging applications since the lasers used in these applications may have many times more power than is required to properly expose the imaging media. Normally one inserts a neutral density filter to reduce the laser power to the proper level when one has too much laser energy. The ability to adjust the deflector throughput efficiency eliminates the need for a laser energy reducing filter.

Figure 3:
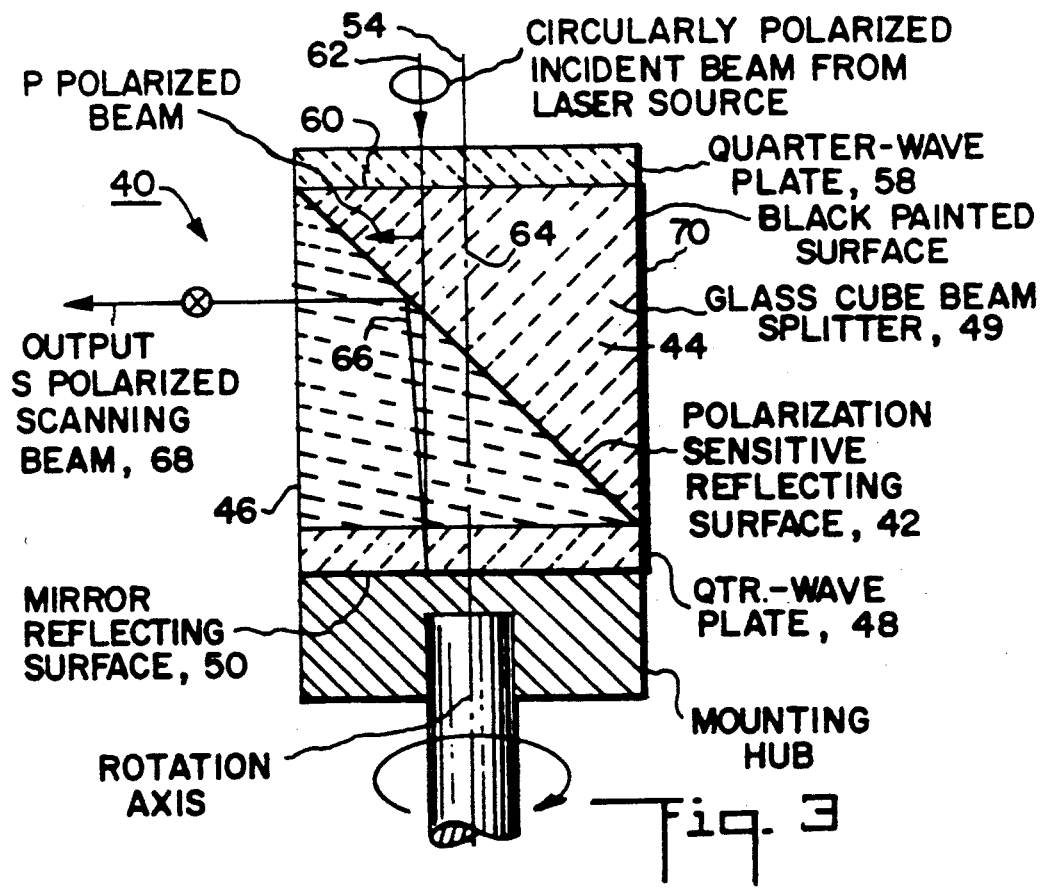
FIG. 3 is a sectional front view of a polarization sensitive dual reflection cube beam deflector unit in accordance with another embodiment of the invention.

Referring to FIG. 3, there is shown a polarization sensitive dual reflection cube beam deflector unit 40 that incorporates the invention for achieving essentially 100 percent radiometric throughput efficiency while also achieving a constant scan beam intensity over the total range of scan angles. The deflector unit 40 is a cube structure having a polarization sensitive reflecting surface 42 sandwiched between two essentially identical 45° right angle glass prisms 44 and 46, which defines a glass cube beams splitter 49, as in Tashiro. The surface 42 transmits light of one polarization and reflects light of polarization orthogonal thereto. In FIG. 3, by way of example, virtually 100% of P polarized lights transmitted and virtually 100% of S polarized light is reflected.

After passing through the polarization sensitive beam splitter reflecting surface 42, a P polarized light beam propagates to a quarter-wave plate 48 having a high reflecting mirror coating 50 on its bottom surface. The quarter-wave plate 48 and reflecting mirror surface 50 are orientated perpendicular to the beam propagation direction and, therefore, the beam is retroreflected back on itself. For illustration purposes, only a single incident ray is shown in FIG. 3 and the retroreflected beam in this figure is shown as propagating at a small angle with respect to the incident beam propagation direction. Preferably, the central incident beam ray 52 for this deflector geometry is collinear with the deflector rotation axis 54.

In accordance with the invention, a quarter-wave plate 58 is optically cemented to the deflector cube top surface 60 and an incident beam 62 which is circularly polarized is used.

The quarter-wave plate 58 in FIG. 3 has its optical axis angularly orientated so that it converts the incident circularly polarized beam 62 into a P polarized beam 64 with regard to the polarization sensitive beam splitter reflecting surface 42 that is sandwiched between the two essentially identical 45 degree right angle prism elements 44 and 46 of the cube beam splitter 49. This P polarized beam is virtually 100 percent transmitted by the polarization sensitive beam splitter surface 42 and propagates to the quarter-wave plate 48 that is optically cemented to deflector cube bottom surface. The incident beam is retroreflected back in the direction of the incident beam 62 source by the reflecting mirror surface 50 which is orientated nearly perpendicular to the incident beam propagating direction.

Due to the retroreflection condition in FIG. 3, the incident beam propagates twice through the second quarter-wave plate 48, thereby experiencing the phase retardation associated with a half-wave plate. The second quarter-wave plate 48 is orientated with its optical axis at 45 degrees to the incident beam polarization directions. The retroreflected beam 66 emerging from this quarter-wave plate 48, is orthogonally polarized with regard to the incident beam polarization direction, and as depicted in FIG. 3 is the S polarized beam 66. The S polarized retroreflected beam 66 propagates back to the polarization sensitive beam splitter reflecting surface 42 where it is essentially totally reflected in a direction perpendicular to the deflector rotation axis and emerges from the deflector element as an S polarized scanning light beam 68. Scanning beam intensity is constant as a function of deflector rotation angle for the deflector 40 because the polarization state of the converted linearly polarized beam stays constant relative to the polarization sensitive beam splitter reflecting surface 42 as a result of using a circularly polarized incident beam and having both quarter-wave plates 48 and 58 rotate with the deflector assembly.

To ensure that specular reflected beams from the cube deflector 40 surfaces are not parallel to the incident beam direction, the element unit 40 is tilted by about two degrees from being perpendicularly orientated to the incident beam direction, as indicated by the angular deviation between the incident beam 64 and the retroreflected beam 66 from the bottom mirror surface 50. Tilting of the deflector cube element can be accomplished by placing a slight wedge member (not shown) between the deflector element and the deflector mounting hub element.

Anti-reflection coatings may be used on the incident beam and output scanning beam surfaces of the cube and the NPDG deflectors units of FIGS. 1, 2 and 3 to both reduce their reflection losses and reduce ghost scan beams associated with specular retroreflected light from these surfaces. A light absorbing coating 70 such as a black carbon base paint having an index of refraction very close to that of the cube deflector element material is shown on the back surface of the deflector unit in FIG. 3. A similar coating 29 (of black paint) is depicted on the outside surface of the counter-balancing port window 31 in the deflector 10 in FIG. 1 and the window 31' in FIG. 2. These black paint surfaces absorb virtually 100 percent of the light that strikes them and thereby function as both a very efficient anti-reflection coating and as a light blocking filter. The use of light blocking as with these painted surfaces is desirable in internal drum scanning systems having an image recording angle of greater than 180 degrees, as shown in FIG. 2.

Figure 4:
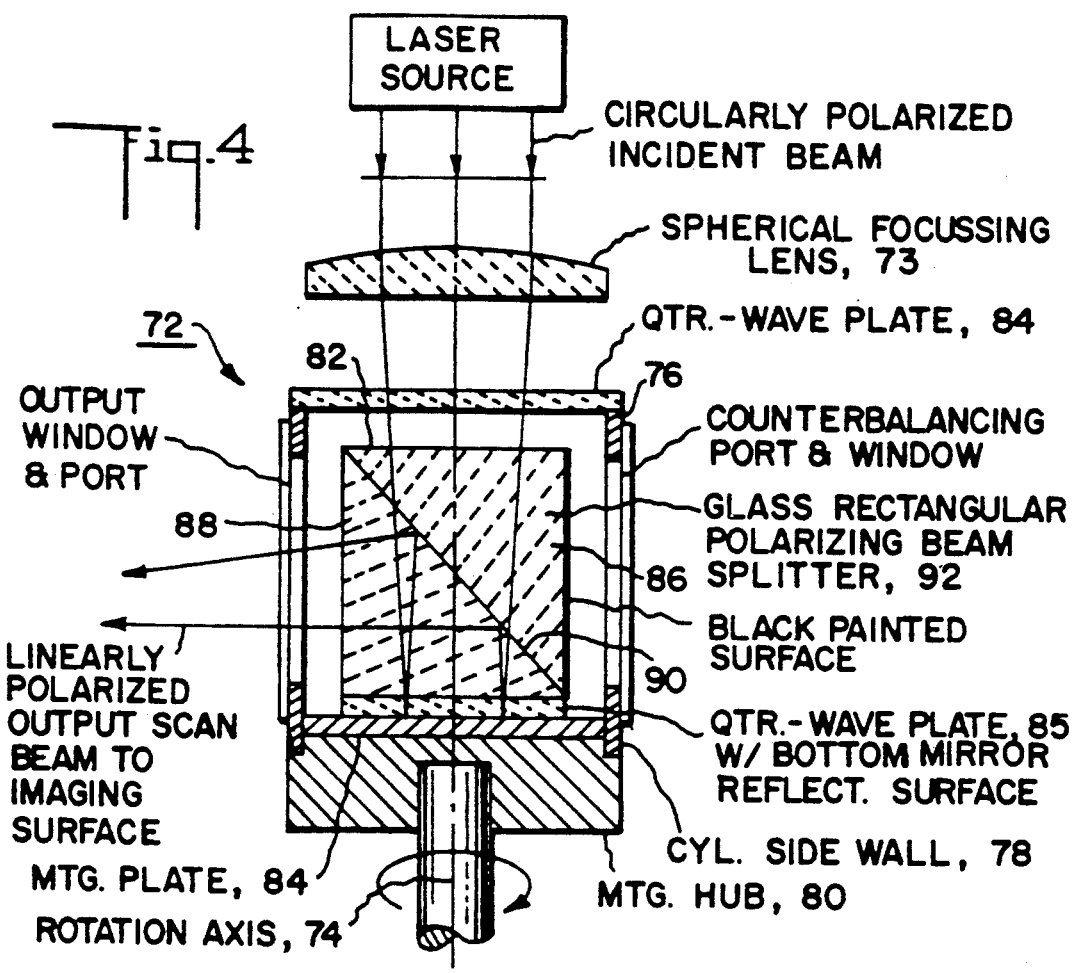
FIG. 4 is a sectional front view of a polarization sensitive dual reflection deflector unit similar to the unit shown in FIG. 3 of a post objective scanner system especially suitable for internal drum imaging applications.

FIG. 4 illustrates a radiometric efficient, polarization sensitive dual reflection rectangular solid beam deflector 72 embodying the invention that is utilized in the postobjective mode with respect to a focusing lens 73 for internal drum imaging applications, and may be mounted on a translating support with its rotation axis 74 coaxial with an internal drum imaging surface, as was the case for the deflector assembly 10' shown in FIG. 2. The deflector unit 72 is an assembly having a housing 76 made up of a cylindrical side wall 78 on a disc shaped mounting hub 80. A rectangular, dual reflection beam deflector unit 82, as described in connection with FIG. 3, is disposed on a mounting plate 84 on the hub 80. Because the inclusion angle between the beam splitter reflector and mirror reflecting surface in deflector assembly 72 is not 45 degrees, the output scanning beam is not perpendicular to the deflector rotation axis when the incident beam is parallel to the rotation axis. As previously noted, this non-perpendicular output scanning beam condition is well-suited for internal drum imaging systems because it prevents the retroreflected specular light from the internal drum image surface from propagating back along the incident beam and causing ghost scan beams and laser intensity instability. While the deflector element 82 is not cubic in shape, it is rotationally mass symmetric with regard to the deflector rotation axis 74.

While the first quarter-wave plate 84 is depicted in FIG. 4 as covering the entire top surface of the deflector housing 76, this quarter-wave plate need only be as large as the deflector entrance aperture and, therefore, may have the form of a circular window in an adapter that is screwed into the deflector housing side wall 78, similar in arrangement to the focusing lens and flat window used in the output apertures of the deflectors in FIG. 2. This type of screw arrangement, as discussed above, facilitates the angular orientation of both quarter-wave plates 84 and 85 optical axes relative to the plane of the beam splitter reflecting surface 90, thereby allowing one to adjust the deflector radiometric throughput efficiency between approximately zero and 100 percent.

The lens 73 of the postobjective operating mode system shown in FIG. 4, provides a non-collimated incident beam in the deflector assembly 72. Both the polarization sensitive beam splitter reflecting surface 90 and the quarter-wave plates 84 and 85 in this deflector assembly are incident angle dependent. When a converging beam is propagated through the deflector assembly, the radiometric throughput efficiency of the deflector decreases as a function of the increase in beam ray deviation angle relative to the deflector rotation axis and, therefore, the larger cone beam ray angles of the converging beam will have lower radiometric throughput efficiency when compared with the axial ray. In effect, this change in radiometric throughput efficiency as a function of ray cone angle causes the beam intensity profile of the incident beam to be apodized, which alters the image spot size intensity profile. Because this apodization effect is the same for all image positions, as a result of having the incident beam be centered on the deflector rotation axis, and because a circularly polarized incident beam is used, the size and shape of this spot where the scan beam intersects the imaging surface (24 FIG. 2) will remain the same for all image positions of interest. The apodization effect is small for converging beams having an f-number of greater than 10, since the maximum cone ray angle for this case is less than 3 degrees.

The quarter-wave plates may be liquid crystal retardation plates. This type of retardation plate may be preferable because it will work with relatively large incidence beam angles, as in a post-objective system. Liquid crystal retardation plates are marketed by Meadowlark Optics of Longmont, Colo. Alternatively, the apodization effect on image spot size shape may be compensated by placing the appropriate aperture profile shape on the deflector entrance window so that it rotates with the deflector and, thereby has the same effect for all image positions. Similar effects result when the wavelength from the laser source shifts or a wavelength range is covered, and may be compensated for by the use of liquid crystal retardation plates for small (eg. ±10 nm) wavelength shifts and achromatic designed retardation plates and beam splitter polarization coatings.

Figure 5:
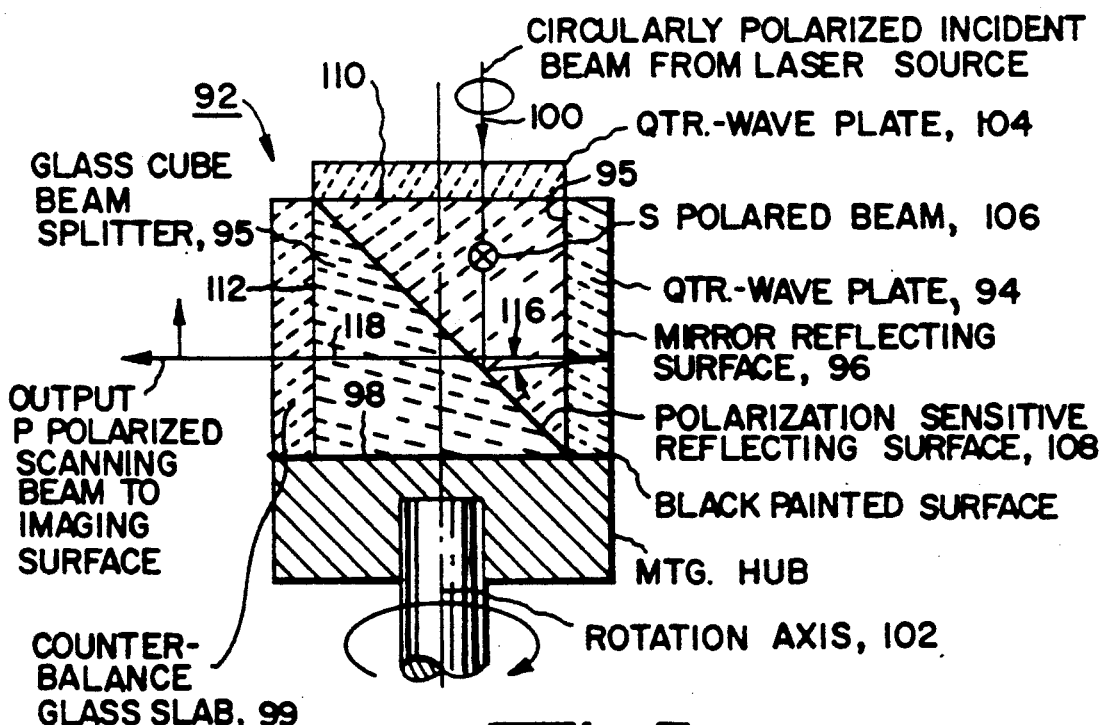
FIG. 5 is a sectional front view of a polarization sensitive dual reflection deflector unit in accordance with still another embodiment of the invention.

FIG. 5 illustrates a polarization sensitive dual reflection cube beam deflector unit 92 that differs from the FIG. 3 deflector configuration by having the second quarter-wave plate 94 attached to the back surface 95 of the beam splitter 95 and by having the back surface 96 of the wave plate 94 of the deflector 92 serve as the high reflecting mirror surface 96, while the bottom surface 98 of the beam splitter 96 is the light absorbing, black painted surface. The scan beam tracking properties of the FIG. 5 deflector assembly 92 are identical to that achieved with the FIG. 3 deflector assembly 40. One advantage of having the black painted surface be on the bottom of the deflector element is that any nonflatness and/or stress induced in this surface by cementing the element to the mounting hub assembly has negligible effect on the optical wavefront quality of the scanning beam. One disadvantage of having the back deflector element surface be the mirror reflecting surface is that this surface experiences centrifugal-force-induced flatness distortion while the bottom deflector element surface is virtually invariant to this type of distortion. Another disadvantage of the FIG. 5 deflector configuration is that gluing the quarter-wave plate 94 to the back of the cube 96 increases both the diameter and mass of the deflector unit as a result of the required counterbalancing glass slab 99.

Only a single incident beam ray 100 is shown for illustrative purposes. The central incident beam ray for this deflector assembly as is desirably collinear with the deflector rotation axis 102. The quarter-wave plate 104 in FIG. 5 has its optical axis angularly oriented so that it converts the incident circularly polarized beam into an S polarized beam 106 with regard to the polarization sensitive beam splitter reflecting surface 108 which is sandwiched between the two essentially identical 45 degree right angle prism elements 110 and 112 comprising the cube beam splitter 96. This S polarized beam 106 is virtually 100 percent reflected by the polarization sensitive beam splitter surface 108 and propagates to the second quarter-wave plate 94 that is optically cemented to the back surface 95. This second quarter-wave plate's high reflecting mirror surface coating 96 is oriented nearly perpendicular to the reflected incident beam propagation direction and, therefore, the reflected incident beam is retroreflected back on itself, except for a small angular offset 116. This angular offset is generated by slightly tilting the deflector assembly with regard to the deflector rotation axis 102. This angular offset is provided to minimize ghost scan beams and laser intensity instability associated with specularly retroreflected beams from deflector surfaces.

Due to the retroreflection condition in FIG. 5, the reflected incident beam effectively propagates twice through the second quarter-wave plate 94, thereby experiencing the phase retardation associated with a half-wave plate. When the second quarter-wave plate 94 is oriented with its optical axis at 45 degrees to the incident beam polarization direction, the retroreflected beam emerging from this quarter-wave plate will be orthogonally polarized with regard to the incident beam polarization direction. The P polarized retroreflected beam 118 propagates back to the polarization sensitive beam splitter reflecting surface, where it is essentially totally transmitted in a direction perpendicular to the deflector rotation axis and emerges from the deflector element as a P polarized scanning light beam. Scanning beam intensity is constant as a function of deflector rotation angle for this deflector configuration because the polarization state of the converted linearly polarized beam stays constant relative to the polarization sensitive beam splitter reflecting surface 96 as a result of using a circularly polarized incident beam and having both quarter-wave plates 94 and 104 rotate with the deflector assembly.

The foregoing description discloses how both essentially 100 percent radiometric throughput efficiency and a constant scan beam intensity over the total range of scan angles, are obtained with the NPDG and the polarization sensitive dual reflection deflectors. The invention is also applicable with other polarization sensitive beam deflector systems. Other variations and modifications, within the scope of the invention, will undoubtedly occur to those skilled in the art. Accordingly, the foregoing description should be taken as illustrative and not in a limiting sense.

We claim:

1. An optical beam scanner for providing a scan beam which moves across a scan receiving surface which comprises means for applying to said scanner an incident optical beam which is circularly polarized and propagates along an axis of rotation of said scanner, means rotatable about said axis for converting said circularly polarized incident beam into a linearly polarized first beam having a polarization direction transverse to said axis and which rotates about said axis, and beam deflection means having a polarization sensitive deflecting surface upon which said first beam is incident and which deflecting surface is rotatable about said axis with said converting means to provide a linearly polarized beam which is incident on said receiving surface as said scan beam, said polarization direction and said deflecting surface being in such angular relationship that maximizes the radiometric throughput efficiency of said scanner.

2. The scanner according to claim 1 wherein said polarization direction is one of two orthogonally polarized directions.

3. The scanner according to claim 2 wherein said polarized directions are approximately orthogonal to said rotation axis.

4. The scanner according to claim 3 wherein said two polarization directions are P and S directions with respect to said deflecting surface.

5. The scanner according to claim 3 wherein said deflection means is provided by a nondisc plane diffraction grating deflector having a grating providing said polarization sensitive deflecting surface which diffracts one of said P and S directions with radiometric efficiency of about 90% or more to provide said scan beam.

6. The scanner according to claim 1 wherein said circularly polarized beam includes optical energy at a certain wavelength, said converting means is a quarter-wavelength retarder at said wavelength.

7. The scanner according to claim 6 wherein said quarter-wave plate is a liquid crystal device.

8. The scanner according to claim 6 wherein said beam deflection means has an entrance aperture through which said linearly polarized first beam passes, said retarder being a wave plate having an optical axis, said plate being mechanically connected to said deflection means and disposed across said entrance aperture.

9. The scanner according to claim 8 wherein said plate optical axis is angularly oriented with respect to said incident beam such that it converts said incident beam into said linearly polarized beam.

10. The scanner according to claim 8 further comprising a focusing lens along said rotation axis in the path of said circularly polarized incident beam, said quarter-wavelength plate being disposed between said lens and said deflection means so that said quarter-wavelength plate and deflection means are in post objective relationship with respect to said lens.

11. The scanner according to claim 8 further comprising means for adjusting the angular orientation of the quarter-wave plate optical axis relative to said polarization sensitive deflecting surface for adjusting the throughput efficiency of said scanner.

12. The scanner according to claim 1 wherein said deflection means is a beam splitter having said polarization sensitive deflecting surface which respectively reflects and transmits different orthogonally polarized directions.

13. The scanner according to claim 12 wherein said deflection means includes means upon which one of said transmitted and reflected polarized directions is incident for retroreflecting said one direction back to said polarization sensitive surface and converting the polarization thereof to a polarization orthogonal to the polarization of the light incident thereon, said retroreflected light being of a polarization orthogonal to the polarization of the linearly polarized first beam and being reflected from or transmitted through said polarization sensitive deflecting surface to provide said scan beam.

14. The scanner according to claim 13 wherein said retroreflecting and converting means is a quarter-wavelength plate having opposite surfaces, one of which faces said polarization sensitive surface and the other of which is reflecting toward said polarization sensitive surface.

15. The scanner according to claim 14 wherein said beam splitter has a back side and a front side facing towards and away from said scan surface, respectively, said beam splitter having a bottom between said sides and a top on which said linearly polarized first beam is incident, said quarter-wavelength plate being either on said bottom or said back side for retroreflecting and converting said transmitted beam when on the bottom or said reflecting beam when on the back side.

16. The scanner according to claim 15 wherein said bottom has a light absorbing material thereon, said plate then being on the back side, and said back side has said light absorbing material thereon said plate then being on the bottom.

17. The scanner according to claim 1 wherein said said applying means includes a source which is stationary while said beam deflecting means rotates so that said circularly polarized incident beam is stationary in space while said beam deflection means rotates in space with said converting means.

* * * * *